June 19, 1928.  1,674,594

H. J. HAMPTON

SEPARATOR RETAINER FOR STORAGE BATTERIES

Filed July 10, 1924

INVENTOR

WITNESS:
Robt R Kitchel.

Harold J. Hampton
BY
Augustus B S roughton.

ATTORNEY.

Patented June 19, 1928.

1,674,594

UNITED STATES PATENT OFFICE.

HAROLD JOHN HAMPTON, OF MANCHESTER, ENGLAND, ASSIGNOR TO THE ELECTRIC STORAGE BATTERY COMPANY, OF PHILADELPHIA, PENNSYLVANIA, A CORPORATION OF NEW JERSEY.

SEPARATOR RETAINER FOR STORAGE BATTERIES.

Application filed July 10, 1924, Serial No. 725,144, and in Great Britain September 12, 1923.

The principal object of the present invention is to provide for the satisfactory and convenient introduction into the space between the plates of a storage battery of glass-felt which is a porous sheet consisting of promiscuously disposed or arranged glass filaments and a bond as gelatin, water-glass or the like innocuous in battery fluid or liquid. Another object of the invention is to obtain the advantage of the use of glass-felt as a retainer for the active material in respect to its plate. Another object of the invention is to protect the separator usually of wood or perforated rubber from attack by the reactions which take place in the battery. Other objects of the invention will appear from the following description at the end of which the invention will be claimed.

Figure 1:
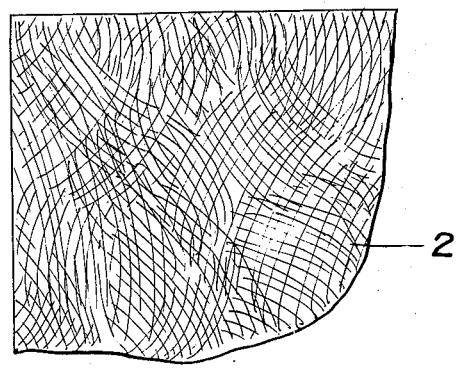
Figure 2:
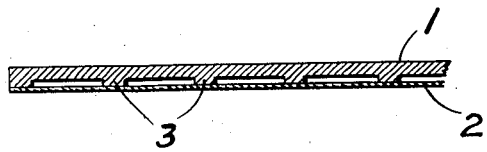

In the following description reference will be made to the accompanying drawings forming part hereof and in which Figure 1 is an elevational view of a portion of a separator-retainer showing the glass-felt face thereof, and Fig. 2 is a transverse sectional view of the same.

In the drawings the separator-retainer for storage batteries comprises a sheet of wood 1 and a sheet of glass-felt 2 adherent thereto. The sheet of wood being connected with the glass-felt affords means by which the glass-felt can be properly assembled between the plates of a storage battery and the glass-felt protects the wood from the effects of battery reactions. As shown the sheet of glass-felt is applied to ribs 3 provided on one face of the sheet of wood that constitutes the separator portion of the structure.

The bond used for holding the filaments of glass in promiscuous arrangement to constitute the sheet of glass-felt may also be used for connecting the sheet of glass-felt with the wood separator in such a way that the two constitute and can be assembled in the battery as a unitary structure.

In using glass felt with wood that is likely to warp and split, the main fibers of the glass felt may be arranged transversely of the grain of the wood in order to oppose that tendency of the wood.

I claim:

A separator-retainer for storage batteries comprising a sheet of wood provided on one face thereof with ribs and a sheet of glass-felt adherent to the ribs.

HAROLD J. HAMPTON.